United States Patent
Cheng et al.

(10) Patent No.: US 10,948,669 B2
(45) Date of Patent: Mar. 16, 2021

(54) METHOD OF COUPLING OPTICAL FIBER OR FIBER ARRAY WITH OPTICAL ACTIVE COMPONENT

(71) Applicant: Prime World International Holdings Ltd., New Taipei (TW)

(72) Inventors: Chin-Lung Cheng, New Taipei (TW); Chien Yin Tung, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 6 days.

(21) Appl. No.: 16/451,907

(22) Filed: Jun. 25, 2019

(65) Prior Publication Data
US 2020/0409002 A1    Dec. 31, 2020

(51) Int. Cl.
*G02B 6/42* (2006.01)

(52) U.S. Cl.
CPC ......... *G02B 6/4227* (2013.01); *G02B 6/4221* (2013.01)

(58) Field of Classification Search
CPC ........................... G02B 6/4227; G02B 6/4221
USPC ............................................................ 385/52
See application file for complete search history.

(56) References Cited

U.S. PATENT DOCUMENTS

| | | | |
|---|---|---|---|
| 6,050,110 A * | 4/2000 | Yoshida | C03B 11/082 264/1.25 |
| 2002/0028049 A1* | 3/2002 | Bartur | G02B 6/4202 385/92 |
| 2007/0009208 A1* | 1/2007 | Guenter | G02B 6/4225 385/52 |

* cited by examiner

*Primary Examiner* — Jerry M Blevins
(74) *Attorney, Agent, or Firm* — Grossman Tucker Perreault & Pfleger, PLLC

(57) ABSTRACT

A method of coupling an optical fiber with an optical active component is disclosed. An active area of the optical active component is recognized. The active area of the optical active component is specified with an active pair of reference coordinates. Positioning the core end facet of the optical fiber according to the active pair of reference coordinates could be performed thereafter.

14 Claims, 9 Drawing Sheets

METHOD OF COUPLING OPTICAL FIBER OR FIBER ARRAY WITH OPTICAL ACTIVE COMPONENT

TECHNICAL FIELD

The present disclosure relates to a coupling method, more particularly to a method of coupling an optical fiber with an optical active component, and a method of coupling a fiber array with an optical active component.

BACKGROUND

Optical transceivers are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different form factors such as XFP (10 Gigabit Small Form Factor Pluggable) used in 10 GB/s communication rate, QSFP (Quad Small Form-factor Pluggable), or others at different communication rates have been made available.

SUMMARY

According to one aspect of the present disclosure, a method of coupling an optical fiber with an optical active component is disclosed. Such disclosed method in one embodiment includes: recognizing an active area of the optical active component, specifying the active area of the optical active component with an active pair of reference coordinates, and positioning a core end facet of the optical fiber according to the active pair of reference coordinates.

According to another aspect of the present disclosure, a method of coupling a fiber array with a first optical active component and a second optical active component is disclosed. The fiber array may include a first optical fiber and a second optical fiber. Such disclosed method in one embodiment includes: recognizing an active area of the first optical active component and an active area of the second optical active component, specifying the active area of the first optical active component with a first active pair of reference coordinates, specifying the active area of the second optical active component with a second active pair of reference coordinates, and positioning core end facets of the first optical fiber and the second optical fiber according to the first active pair of reference coordinates and the second active pair of reference coordinates, respectively.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
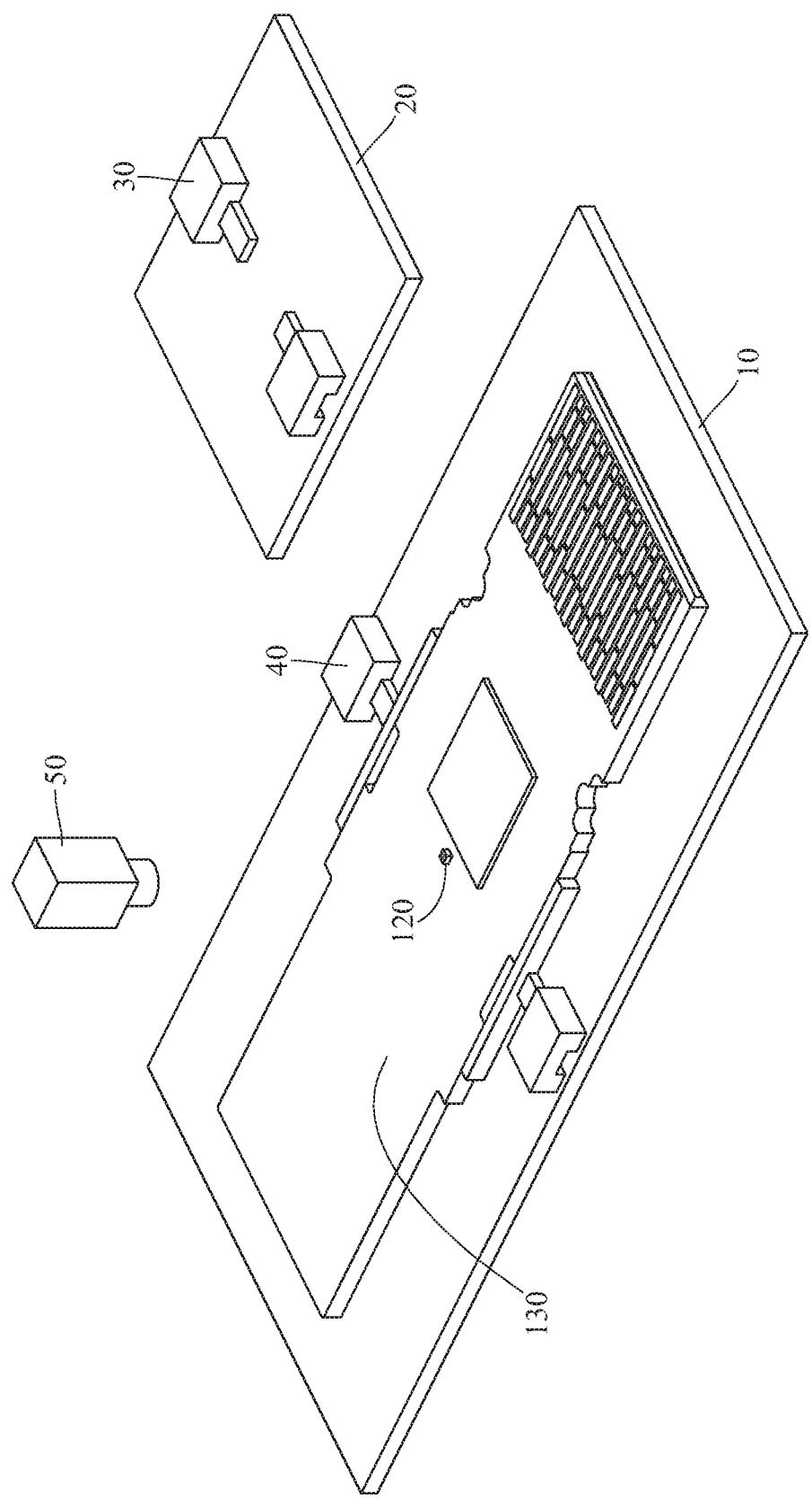
FIG. 1 is a schematic view of an apparatus for coupling an optical fiber with an optical active component, according to one embodiment of the present disclosure.

FIG. 1 is a schematic view of an apparatus for coupling an optical fiber with an optical active component, according to one embodiment of the present disclosure. An apparatus 1 includes a carrier 10, a moving stage 20, a fixing device 30, a holder 40 and a camera 50.

The carrier 10 is configured to support a substrate where an optical transceiver module is disposed. The moving stage 20 is movable relative to the carrier 10. The fixing device 30 is disposed on the moving stage 20 and configured to maintain an optical fiber on the moving stage 20. The holder 40 is configured to physically hold the substrate at a predetermined position. The camera 50 is movable between the carrier 10 and the moving stage 20 and configured to capture an image including the optical fiber and the optical transceiver module.

Figure 2:
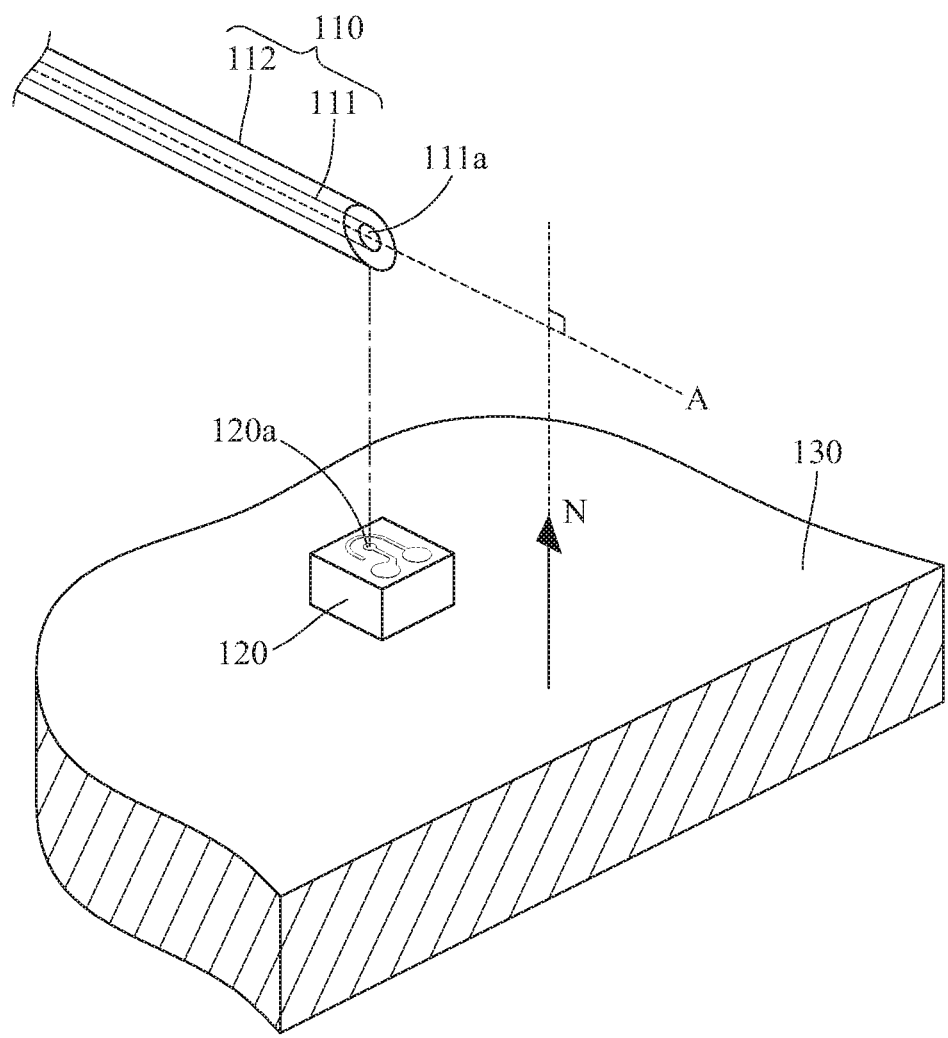
FIG. 2 is a perspective view of the optical fiber and the optical active component according to a first embodiment of the present disclosure.

Details of an optical fiber and an optical active component are described as follows. FIG. 2 is a perspective view of the optical fiber and the optical active component according to a first embodiment of the present disclosure. In this embodiment, an optical fiber 110 includes a core 111 and a cladding 112, and a core end facet 111a of the optical fiber 110 is, for example, a 45 degrees end facet. In another implementation, the core end facet 111a is a 42.5-degree end facet.

An optical transceiver module includes an optical active component 120 disposed on a substrate 130. The substrate 130 is, for example, a circuit board configured to be accommodated in an optical transceiver. The optical active component 120 is either an optical transmitter or an optical receiver in one implementation. The optical transmitter, for example, is a light emitter such as laser diode and light emitting diode. The optical receiver, for example, is a photodetector such as P-I-N photodiode and avalanche photodiode.

The optical active component 120 includes an active area 120a configured to be optically coupled with the optical fiber 110. When the optical active component 120 is an optical transmitter, the active area 120a is a window through which light could be emitted toward the core end facet 111a of the optical fiber 110. When the optical active component 120 is an optical receiver, the active area 120a is a window through which light could be received from the optical fiber 110.

Figure 3:
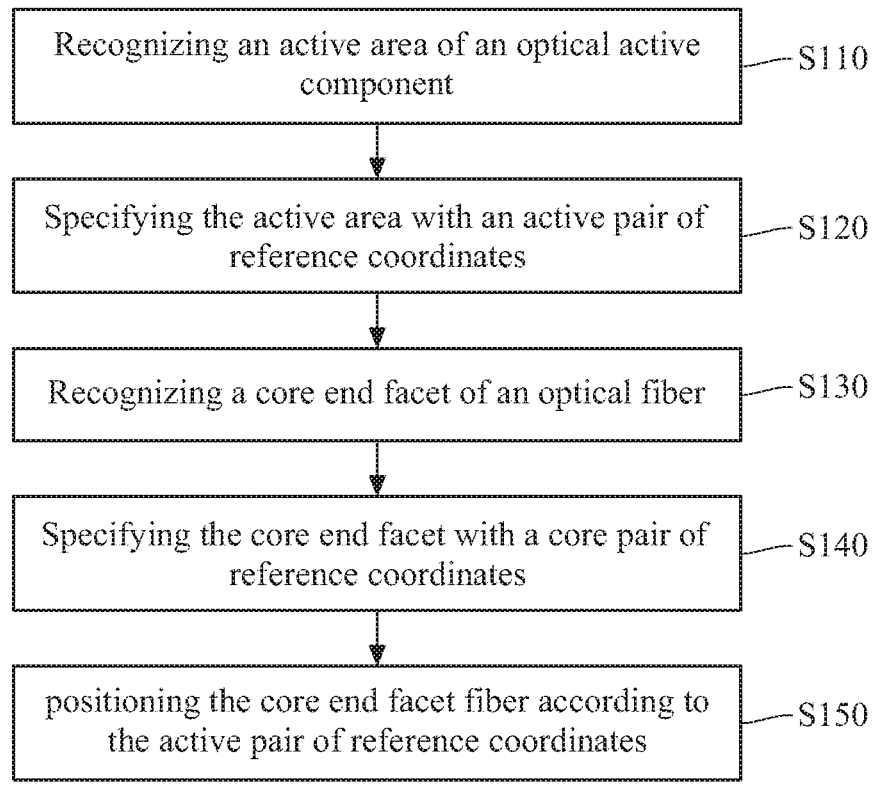
FIG. 3 is a flow chart of a method of coupling the optical fiber with the optical active component, according to the first embodiment of the present disclosure.
Figure 4:
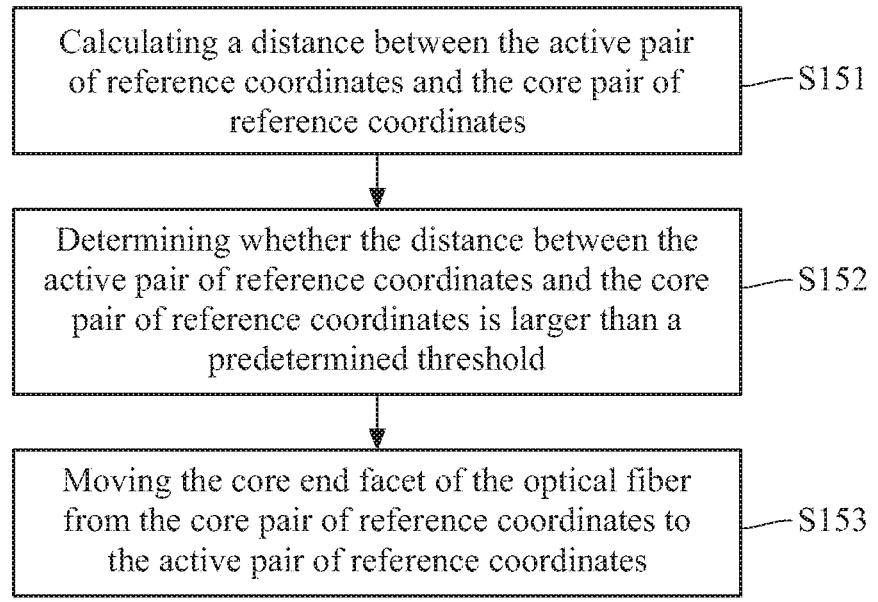
FIG. 4 is a flow chart of positioning a core end facet of the optical fiber step in FIG. 3.
Figure 5:
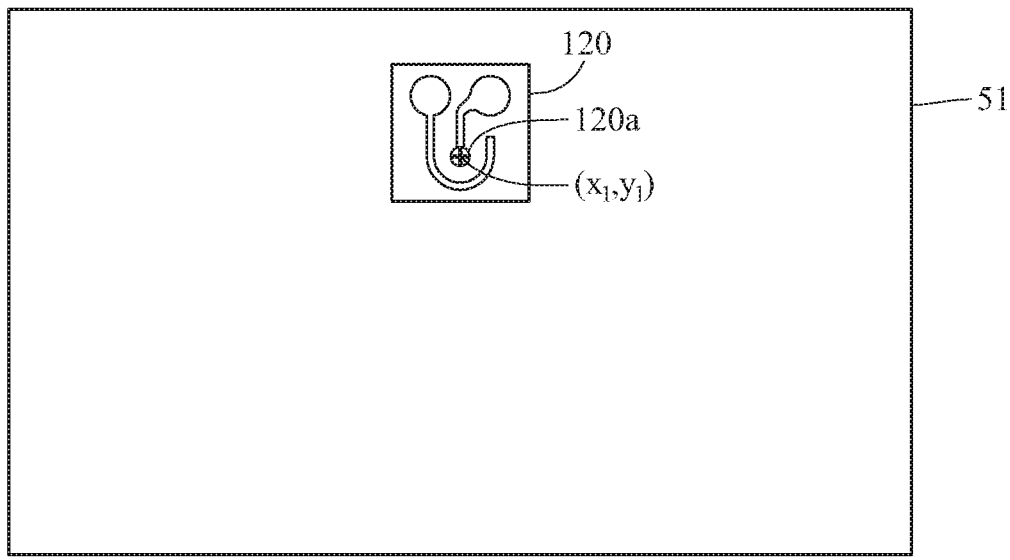
FIG. 5 to FIG. 7 are schematic views of coupling the optical fiber with the optical active component by using the apparatus in FIG. 1.
Figure 6:
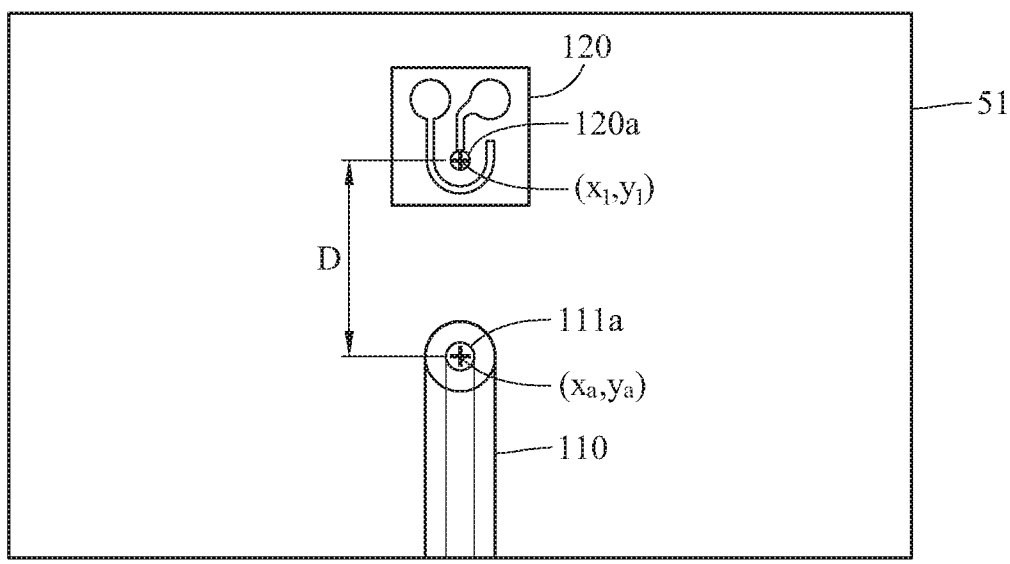
Figure 7:
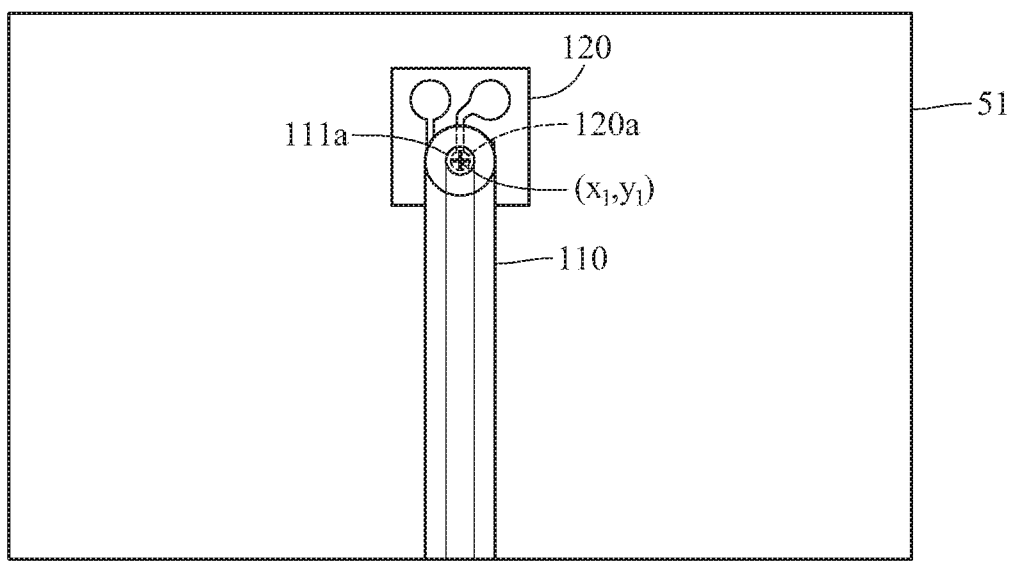

In the first embodiment, a method of coupling the optical fiber 110 with the optical active component 120 is disclosed as follows. FIG. 3 is a flow chart of a method of coupling the optical fiber with the optical active component, according to the first embodiment of the present disclosure. FIG. 4 is a flow chart of positioning the core end facet of the optical fiber step in FIG. 3. FIG. 5 to FIG. 7 are schematic views of coupling the optical fiber with the optical active component by using the apparatus in FIG. 1. In this embodiment, the method of coupling the optical fiber 110 with the optical active component 120 includes steps S110 through S150.

In the step S110, the active area 120a of the optical active component 120 is recognized. As shown in FIG. 1 and FIG. 5, the substrate 130 with the optical active component 120 is supported on the carrier 10 of the apparatus 1 and clamped by the holder 40. The camera 50 is moved over the substrate 130, and therefore help the carrier 10, which may be underneath the camera 50, to be positioned. More specifically, the camera 50 is positioned to capture an image 51 before recognizing the active area 120a of the optical active component 120.

In the step S120, the active area 120a of the optical active component 120 is specified with an active pair of reference coordinates $(x_1, y_1)$. In detail, a center of the active area 120a is specified with the active pair of reference coordinates $(x_1, y_1)$ in the image 51 of the camera 50. The active pair of reference coordinates $(x_1, y_1)$ may be marked on the display showing the image 51. The $x_1$ is a horizontal distance with respect to an origin of reference coordinates, and the $y_1$ is a vertical distance with respect to the origin of reference coordinates.

In the step S130, the core end facet 111a of the optical fiber 110 is recognized. As shown in FIG. 1 and FIG. 6, the first optical fiber 110 is disposed on the moving stage 20 and remains unmoved because of the fixing device 30. The moving stage 20 is moved relative to the carrier 10 so as to allow for the core end facet 111a of the optical fiber 110 to be below the camera 50. The camera 50 recognizes the core end facet 111a of the optical fiber 110.

In the step S140, the core end facet 111a of the optical fiber 110 is specified with a core pair of reference coordinates $(x_a, y_a)$. In detail, a center of the core end facet 111a is specified with the core pair of reference coordinates $(x_a, y_a)$ in the image 51 of the camera 50. The core pair of reference coordinates $(x_a, y_a)$ may be marked on the display showing the image 51. In this embodiment, the core pair of reference coordinates $(x_a, y_a)$ corresponds to the center of the core end facet 111a of the optical fiber 110.

In the step S150, the core end facet 111a of the optical fiber 110 is positioned according to the active pair of reference coordinates $(x_1, y_1)$ and the core pair of reference coordinates $(x_a, y_a)$. As such, the core end facet 111a of the optical fiber 110 could be placed at the active pair of reference coordinates $(x_1, y_1)$. As shown in FIG. 4, the step S150 of this embodiment includes steps S151 and S153.

In the step S151, a distance between the active pair of reference coordinates $(x_1, y_1)$ and the core pair of reference coordinates $(x_a, y_a)$ is calculated. As shown in FIG. 6, a distance D between the core pair of reference coordinates $(x_a, y_a)$ and the active pair of reference coordinates $(x_1, y_1)$ could be represented, for example, as $[(x_a-x_1)^2+(y_a-y_1)_2]^{1/2}$.

The step S152 further determines whether the distance D between the active pair of reference coordinates $(x_1, y_1)$ and the core pair of reference coordinates $(x_a, y_a)$ is larger than a predetermined threshold.

Next, the step S153 further moves the core end facet 111a of the optical fiber 110 from the core pair of reference coordinates $(x_a, y_a)$ to the active pair of reference coordinates $(x_1, y_1)$. As shown in FIG. 1 and FIG. 7, the optical fiber 110 is moved by the moving stage 20 so as to position the center of the core end facet 111a at the active pair of reference coordinates $(x_1, y_1)$.

In this embodiment, as shown in FIG. 2, when the step 150 is performed, a central axis A of the core 111 of the optical fiber 110 is ensured orthogonal to a normal direction N of the active area 120a of the optical active component 120 for preventing misalignment due to tilt of the substrate 130.

Figure 8:
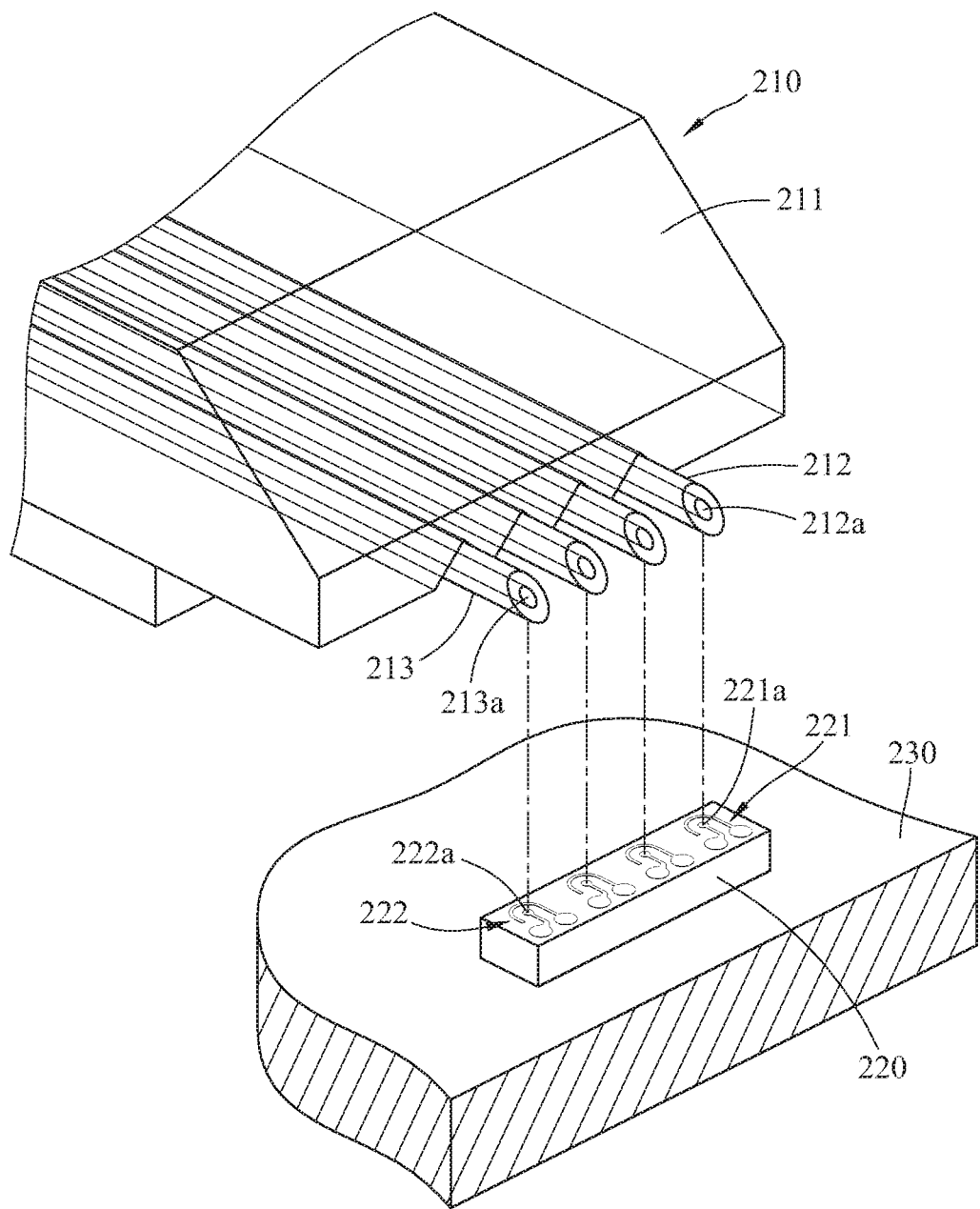
FIG. 8 is a perspective view of a fiber array and an optical transceiver module according to a second embodiment of the present disclosure.

FIG. 8 is a perspective view of a fiber array and an optical transceiver module according to a second embodiment of the present disclosure. In this embodiment, a fiber array 210 includes a main body 211 and multiple optical fibers such as a first optical fiber 212 and a second optical fiber 213 disposed in V grooves of the main body 211. Both a core end facet 212a of the first optical fiber 212 and a core end facet 213a of the second optical fiber 213 are, for example, with 45-degree end facets.

The fiber array 210 is configured to be coupled with an optical transceiver module 220. The optical transceiver module 220, which is disposed on a substrate 230, includes a first optical active component 221 corresponding to the first optical fiber 212 and a second optical active component 222 corresponding to the second optical fiber 213. An active area 221a of the first optical active component 221 is configured to be coupled with the first optical fiber 212, and an active area 222a of the second optical active component 222 is configured to be coupled with the second optical fiber 213. The present disclosure provides one efficient approach for coupling the optical fiber 212 or 213 with the active area 221a of the first optical active component 221 or the active area 222a of the second active component 222.

In the second embodiment, a method of coupling the fiber array 210 with the optical transceiver module 220 is basically similar to the method disclosed in the first embodiment. FIG. 10 to FIG. 13 are schematic views of coupling the fiber array with multiple optical active components by using the apparatus in FIG. 1.

Figure 10:
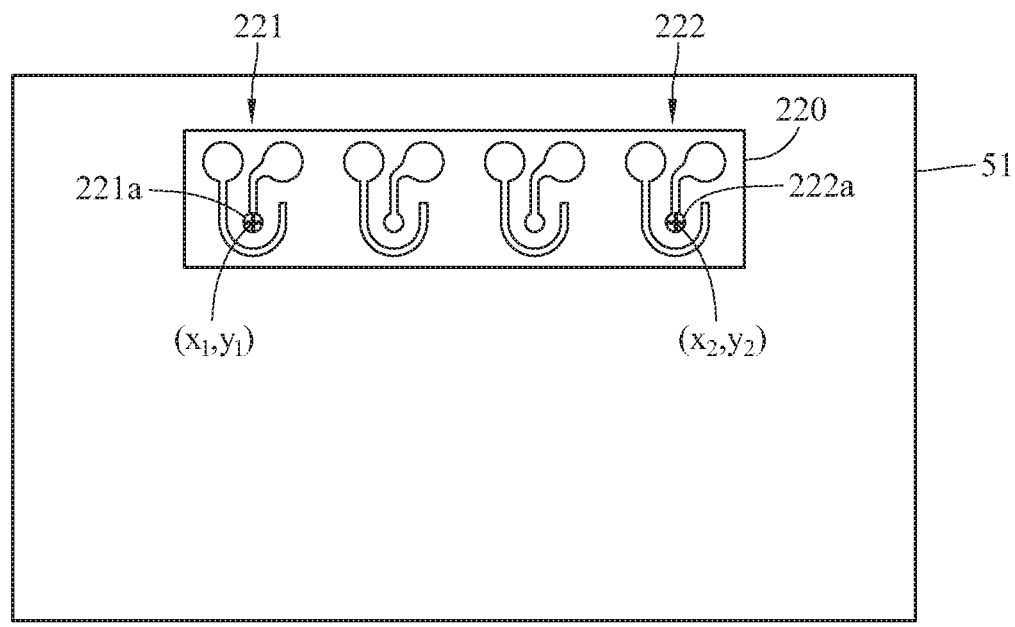
FIG. 10 to FIG. 13 are schematic views of coupling the fiber array with multiple optical active components by using the apparatus in FIG. 1.

Firstly, the active area 221a of the first optical active component 221 and the active area 222a of the second optical active component 222 are recognized. As shown in FIG. 1 and FIG. 10, the substrate 230 with the optical transceiver module 220 is supported on the carrier 10 of the apparatus 1 and clamped by the holder 40. The camera 50 is moved to be above the substrate 230. The camera 50 recognizes the active area 221a of the first optical active component 221 and the active area 222a of the second optical active component 222.

Next, the active area 221a of the first optical active component 221 is specified with a first active pair of reference coordinates $(x_1, y_1)$, and the active area 222a of the second optical active component 222 is specified with a second active pair of reference coordinates $(x_2, y_2)$. In detail, a center of the active area 221a is specified with the first active pair of reference coordinates $(x_1, y_1)$ in the image 51 of the camera 50. A center of the active area 222a is specified with the second active pair of reference coordinates $(x_2, y_2)$ in the image 51 of the camera 50. Both the first active pair of reference coordinates ($x_1$, $y_1$) and the second active pair of reference coordinates ($x_2$, $y_2$) are marked on the display showing the image 51.

Figure 11:
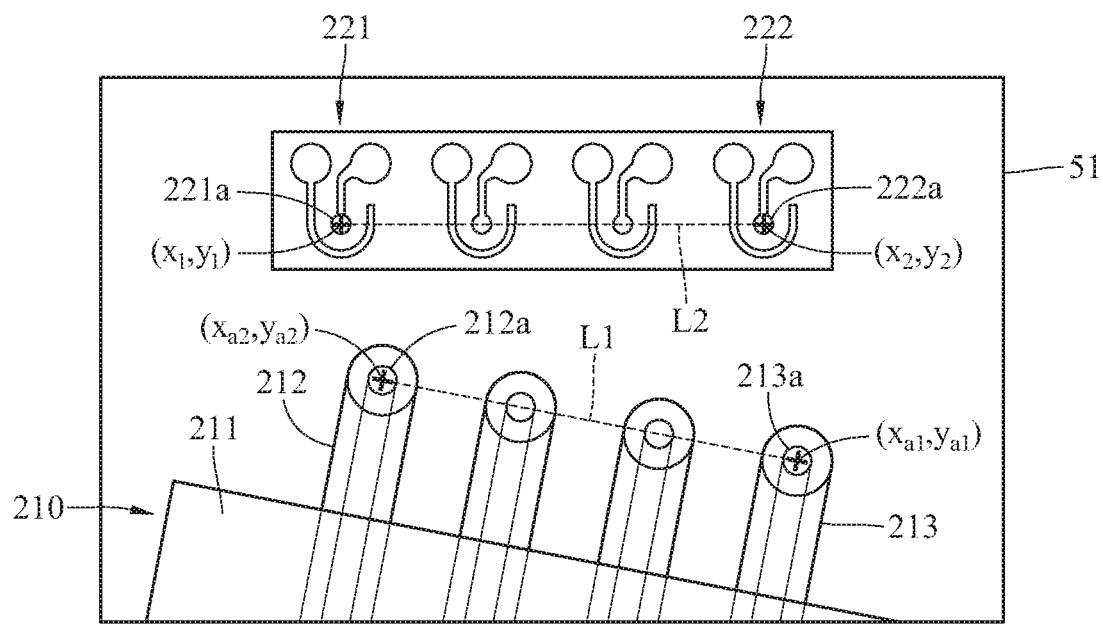

Then, the core end facet 212a of the first optical fiber 212 and the core end facet 213a of the second optical fiber 213 are recognized. As shown in FIG. 1, FIG. 8 and FIG. 11, the fiber array 210 is disposed on the moving stage 20 and remains unmoved by the fixing device 30. The moving stage 20 is moved relative to the carrier 10 to locate the core end facet 212a and 213a below the camera 50. The camera 50 recognizes the core end facet 212a of the first optical fiber 212 and the core end facet 213a of the second optical fiber 213.

A center of the core end facet 212a is specified with a first core pair of reference coordinates ($x_{a1}$, $y_{a1}$) in the image 51 of the camera 50. A center of the core end facet 213a is specified with a second core pair of reference coordinates ($x_{a2}$, $y_{a2}$) in the image 51. Both the first core pair of reference coordinates ($x_{a1}$, $y_{a1}$) and the second core pair of reference coordinates ($x_{a2}$, $y_{a2}$) are marked on the display showing the image 51.

Figure 9:
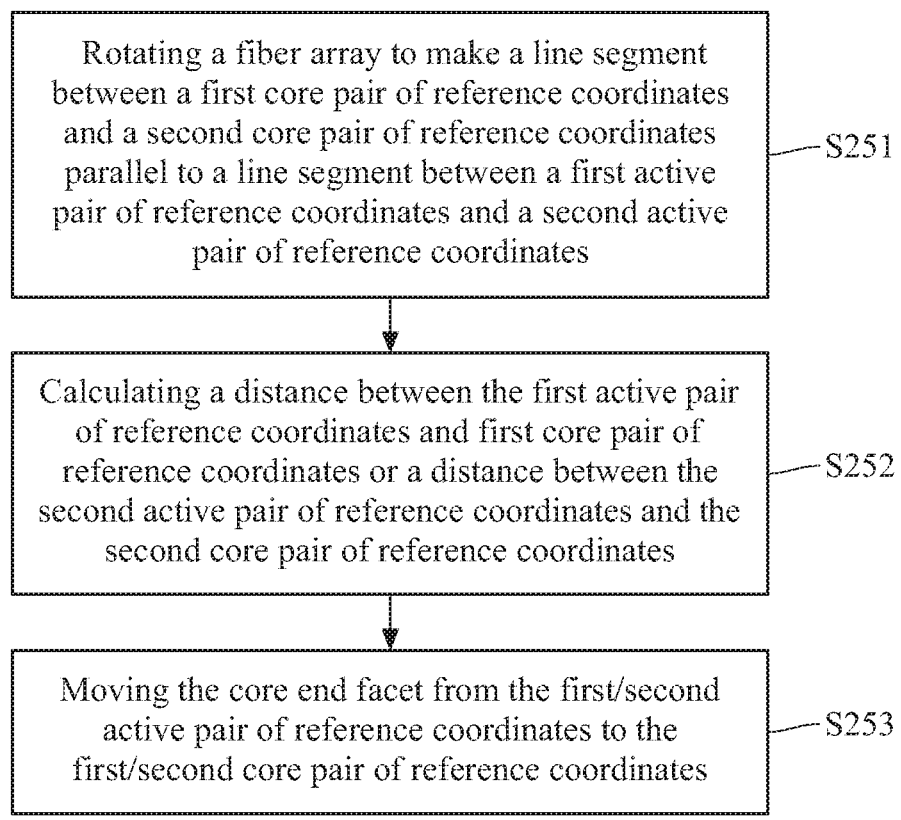
FIG. 9 is a flow chart of positioning core end facets of optical fibers according to the second embodiment of the present disclosure.

The disclosed method may then proceed to position the core end facets of the optical fibers according to the first active pair of reference coordinates ($x_1$, $y_1$) and the second active pair of reference coordinates ($x_2$, $y_2$). In this embodiment, the step of positioning the core end facets is different from its counterpart disclosed in the first embodiment. FIG. 9 is a flow chart of positioning the core end facets according to the second embodiment of the present disclosure.

In the step S251, the fiber array 210 is rotated to enable a virtual line segment L1 between the first core pair of reference coordinates ($x_{a1}$, $y_{a1}$) and the second core pair of reference coordinates ($x_{a2}$, $y_{a2}$) to be substantially in parallel to another virtual line segment L2 between the first active pair of reference coordinates ($x_1$, $y_1$) and the second active pair of reference coordinates ($x_2$, $y_2$).

Figure 12:
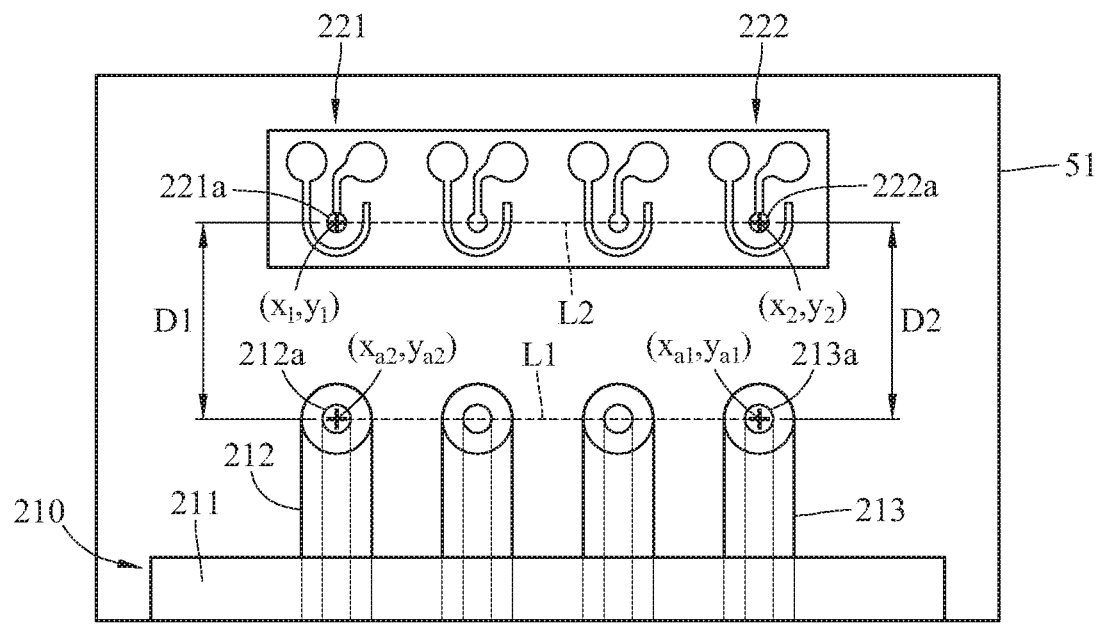

As shown in FIG. 11 and FIG. 12, the line segments L1 and L2 are presented in the image 51. When there is an angle between extensions of the line segments L1 and L2, the moving stage 20 may be further rotate to enable the line segment L1 to be in parallel to the line segment L2. In some embodiments, the fiber array 210 is rotated such that the line segment L1 overlaps with the line segment L2.

It is noted that the step S251 is performed optionally only when the angle actually exists between the extension of the line segments L1 and L2.

In the step S252, a distance D1 between the first active pair of reference coordinates ($x_1$, $y_1$) and the first core pair of reference coordinates ($x_{a1}$, $y_{a1}$) is calculated, or alternatively, a distance D2 between the second active pair of reference coordinates ($x_2$, $y_2$) and the second core pair of reference coordinates ($x_{a2}$, $y_{a2}$) is calculated.

In the step S253, the core end facet 212a of the first optical fiber 212 is moved from the first core pair of reference coordinates ($x_{a1}$, $y_{a1}$) to the first active pair of reference coordinates ($x_1$, $y_1$), if the distance D1 between the first active pair of reference coordinates ($x_1$, $y_1$) and the first core pair of reference coordinates ($x_{a1}$, $y_{a1}$) exceeds another predetermined threshold; or alternatively, the core end facet 213a of the second optical fiber 213 is moved from the second core pair of reference coordinates ($x_{a2}$, $y_{a2}$) to the second active pair of reference coordinates ($x_2$, $y_2$), if the distance D2 between the second active pair of reference coordinates ($x_2$, $y_2$) and the second core pair of reference coordinates ($x_{a2}$, $y_{a2}$) exceeds another predetermined threshold.

Figure 13:
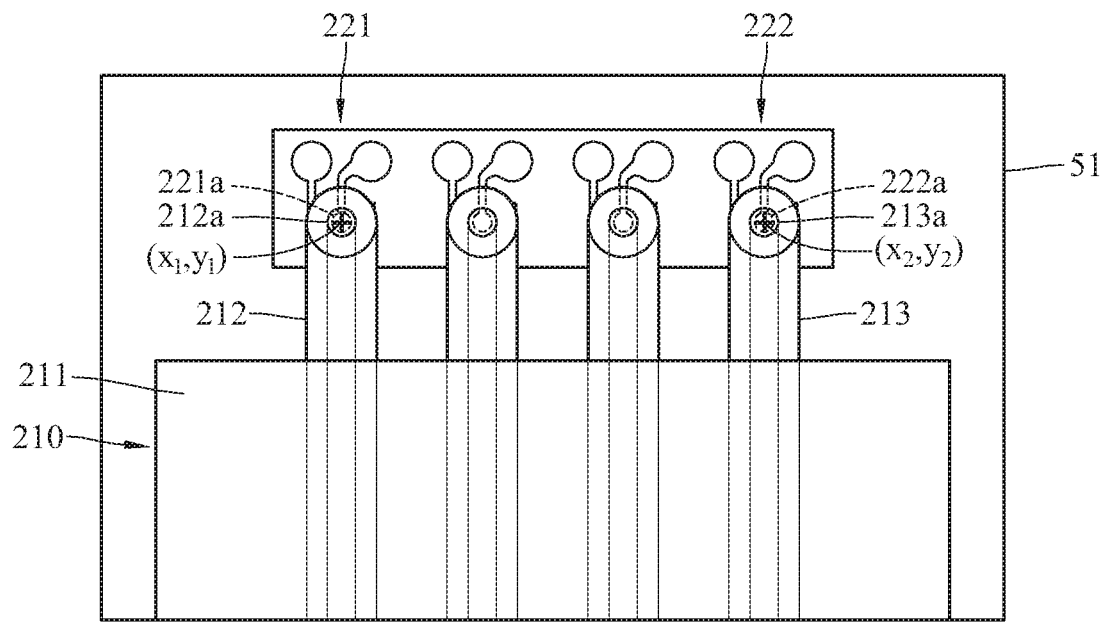

As shown in FIG. 12 and FIG. 13, when the first active pair of reference coordinates ($x_1$, $y_1$) is chosen for alignment, the fiber array 210 is moved by the moving stage 20 so as to position the center of the core end facet 212a at the first active pair of reference coordinates ($x_1$, $y_1$). When the second active pair of reference coordinates ($x_2$, $y_2$) is chosen for alignment, the fiber array 210 is moved by the moving stage 20 so as to position the core end facet 213a at the second active pair of reference coordinates ($x_2$, $y_2$).

Finally, the substrate 230 is bonded with the fiber array 210. In detail, ultra violet (UV) glue is dispersed on either the main body 211 of the fiber array 210 or a top surface of the substrate 230 where the optical transceiver module 220 is located. The fiber array 210 is firmly attached to the surface of the substrate 230 by UV curing. It is worth noting that the attachment of the fiber array 210 to the substrate 230 by UV curing in the present disclosure is just one example. In some other embodiments, the substrate 230 is attached to the substrate by heating or other commercially feasible methods.

According to the present disclosure, when the optical fiber is coupled with the optical active component which is an optical receiver, light in the optical fiber is reflected by the core end facet so as to travel toward the optical active component; when the optical fiber is coupled with the optical active component which is an optical transmitter, light emitting from the optical active component is reflected by the core end facet so as to enter into the optical fiber.

Traditionally, the optical fiber is coupled with active area of the optical active component by using an active coupling process. Specifically, in the active coupling process, light is provided in the optical fiber, and the coupling between the optical fiber and the optical active component is determined according to RSSI (Received signal strength indication) and optical TX power. However, the traditional active coupling process leads to the following disadvantages:

(1) long process time due to the confirmation of coupling efficiency between the optical fiber and the optical active component;

(2) alignment error of about 8 micrometers due to thermal expansion of the substrate caused by the power of light;

(3) insertion loss due to repeated plugging and unplugging of the optical fiber; and (4) abrasion on both the optical fiber and a MT Ferrule as well as an accumulation of dust on the MT Ferrule due to repeated plugging and unplugging of the optical fiber.

According to the present disclosure, the alignment of the optical fiber/fiber array with the optical active component is performed according to the positions of the core end facet of the optical fiber (core pair of reference coordinates) and the active area of the optical active component (active pair of reference coordinates). In other words, there is no light passing through the optical fiber when the alignment, which is accomplished by the movement of the optical fiber/fiber array, is performed. The coupling method disclosed in the present disclosure enjoys the following advantages:

(1) shorter process time in the absence of confirming the coupling efficiency;

(2) an alignment error of only 5 micrometers due to the prevention of thermal expansion of the substrate;

(3) reduction of insertion loss since it is not necessary to repeatedly plug and unplug the optical fiber; and (4) reduction of abrasion on both the optical fiber and a MT Ferrule as well as prevention of dust accumulation on the MT Ferrule.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. A method of coupling an optical fiber with an optical active component, the method comprising:
 recognizing an active area of the optical active component within an image captured by a camera;
 specifying the active area of the optical active component with an active pair of reference coordinates based on the recognized active area of the optical component within the captured image;
 positioning a core end facet of the optical fiber according to the active pair of reference coordinates;
 recognizing the core end facet of the optical fiber within the captured image; and
 specifying the core end facet of the optical fiber with a core pair of reference coordinates based on the recognized core end facet of the optical fiber within the captured image.

2. The method according to claim 1, further comprising:
 recognizing the core end facet of the optical fiber; and
 specifying the core end facet of the optical fiber with a core pair of reference coordinates;
 wherein positioning the core end facet of the optical fiber according to the active pair of reference coordinates further comprises:
 calculating a distance between the active pair of reference coordinates and the core pair of reference coordinates; and
 if the distance between the active pair of reference coordinates and the core pair of reference coordinates exceeds a first predetermined threshold, moving the core end facet from the core pair of reference coordinates to the active pair of reference coordinates.

3. The method according to claim 2, wherein the core pair of reference coordinates corresponds to a center of the core end facet of the optical fiber.

4. The method according to claim 1, wherein a central axis of the optical fiber is orthogonal to a normal direction of the active area at the time of positioning the core end facet of the optical fiber according to the active pair of reference coordinates.

5. The method according to claim 1, wherein the optical active component is either an optical transmitter or an optical receiver.

6. The method according to claim 1, wherein positioning the core end facet of the optical fiber according to the active pair of reference coordinates is performed without any light passing through the optical fiber.

7. The method according to claim 1, further comprising holding, via a holder, the active optical component at a predetermined position, and wherein positioning the core end facet of the optical fiber according to the active pair of reference coordinates further includes moving the core end facet relative to the predetermined position of the active optical component.

8. The method according to claim 1, further comprising disposing the active optical component on a surface of a substrate prior to recognizing the active area of the optical active component within the image captured by the camera, and wherein positioning the core end facet of the optical fiber according to the active pair of reference coordinates further includes disposing a central axis of the optical fiber substantially parallel with the surface of the substrate.

9. The method according to claim 1, further comprising identifying a position of the core end facet of the optical fiber relative to the active area of the optical active component without any light passing through the optical fiber, and wherein positioning the core end facet of the optical fiber according to the active pair of reference coordinates further comprises moving the core end facet based on the identified position.

10. The method according to claim 9, wherein identifying the position of the core end facet of the optical fiber relative to the active area of the optical active component further comprises comparing the core pair of reference coordinates corresponding to the recognized core end facet of the optical fiber to the active pair of reference coordinates corresponding to the optical active component.

11. The method according to claim 1, further comprising moving the camera relative to the optical active component prior to recognizing the active area of the optical active component within the image captured by the camera.

12. A method of coupling a fiber array with a first optical active component and a second optical active component, the fiber array comprising a first optical fiber and a second optical fiber, the method comprising:
 recognizing an active area of the first optical active component and an active area of the second optical active component;
 specifying the active area of the first optical active component with a first active pair of reference coordinates;
 specifying the active area of the second optical active component with a second active pair of reference coordinates;
 positioning a core end facet of the first optical fiber according to the first active pair of reference coordinates and a core end facet of the second optical fiber according to the second active pair of reference coordinates;
 recognizing the core end facet of the first optical fiber and the core end facet of the second optical fiber;
 specifying the core end facet of the first optical fiber with a first core pair of reference coordinates; and
 specifying the core end facet of the second optical fiber with a second core pair of reference coordinates;
 wherein positioning the core end facet of the first optical fiber according to the first active pair of reference coordinates and the core end facet of the second optical fiber according to the second active pair of reference coordinates further comprises:
 rotating the fiber array to enable a line segment between the first core pair of reference coordinates and the second core pair of reference coordinates to be in parallel to a line segment between the first active pair of reference coordinates and the second active pair of reference coordinates.

13. The method according to claim 12, wherein positioning the core end facet of the first optical fiber according to the first active pair of reference coordinates and the core end facet of the second optical fiber according to the second active pair of reference coordinates further comprises:
 if a distance between the first active pair of reference coordinates and the first core pair of reference coordinates exceeds a second predetermined threshold, moving the core end facet of the first optical fiber from the first core pair of reference coordinates to the first active pair of reference coordinates; or if a distance between the second active pair of reference coordinates and the second core pair of reference coordinates exceeds a third predetermined threshold, moving the core end facet of the second optical fiber from the second core pair of reference coordinates to the second active pair of reference coordinates.

14. The method according to claim 12, wherein positioning the core end facet of the first optical fiber according to the first active pair of reference coordinates and the core end facet of the second optical fiber according to the second active pair of reference coordinates is performed without any light passing through the first optical fiber and the second optical fiber.

* * * * *